US010419406B2

United States Patent
du Toit

(10) Patent No.: US 10,419,406 B2
(45) Date of Patent: Sep. 17, 2019

(54) EFFICIENT FORWARDING OF ENCRYPTED TCP RETRANSMISSIONS

(71) Applicant: Netronome Systems, Inc., Santa Clara, CA (US)

(72) Inventor: Roelof Nico du Toit, Portersville, PA (US)

(73) Assignee: Netronome Systems, Inc., Santa Clara, CA (US)

( * ) Notice: Subject to any disclaimer, the term of this patent is extended or adjusted under 35 U.S.C. 154(b) by 0 days.

(21) Appl. No.: 15/860,652

(22) Filed: Jan. 2, 2018

(65) Prior Publication Data

US 2018/0176191 A1    Jun. 21, 2018

Related U.S. Application Data

(63) Continuation of application No. 14/854,046, filed on Sep. 15, 2015, now abandoned, which is a continuation of application No. 13/737,907, filed on Jan. 9, 2013, now Pat. No. 9,154,468.

(51) Int. Cl.
*H04L 29/06* (2006.01)

(52) U.S. Cl.
CPC ........ *H04L 63/0428* (2013.01); *H04L 63/168* (2013.01)

(58) Field of Classification Search
None
See application file for complete search history.

(56) References Cited

U.S. PATENT DOCUMENTS

| 7,890,612 | B2 * | 2/2011 | Todd | G06F 21/577 709/220 |
| 7,978,716 | B2 * | 7/2011 | Rao | H04L 63/0272 370/352 |
| 8,063,799 | B2 * | 11/2011 | Samuels | H03M 7/3084 341/87 |
| 8,433,783 | B2 * | 4/2013 | Jackowski | H04L 47/19 370/469 |
| 8,831,041 | B2 * | 9/2014 | Keith | H04L 47/2433 370/477 |
| 2002/0035681 | A1 * | 3/2002 | Maturana | H04L 63/0428 713/151 |

(Continued)

*Primary Examiner* — Farid Homayounmehr
*Assistant Examiner* — Olanrewaju J. Bucknor
(74) *Attorney, Agent, or Firm* — Imperium Patent Works LLP; T. Lester Wallace; Amir V. Adibi

(57) ABSTRACT

A network device receives TCP segments of a flow via a first SSL session and transmits TCP segments via a second SSL session. Once a TCP segment has been transmitted, the TCP payload need no longer be stored on the network device. Substantial memory resources are conserved, because the device may have to handle many retransmit TCP segments at a given time. If the device receives a retransmit segment, then the device regenerates the retransmit segment to be transmitted. A data structure of entries is stored, with each entry including a decrypt state and an encrypt state for an associated SSL byte position. The device uses the decrypt state to initialize a decrypt engine, decrypts an SSL payload of the retransmit TCP segment received, uses the encrypt state to initialize an encrypt engine, re-encrypts the SSL payload, and then incorporates the re-encrypted SSL payload into the regenerated retransmit TCP segment.

20 Claims, 13 Drawing Sheets

(56) References Cited

U.S. PATENT DOCUMENTS

| | | | |
|---|---|---|---|
| 2003/0014623 A1* | 1/2003 | Freed | H04L 29/06 |
| | | | 713/150 |
| 2003/0014624 A1 | 1/2003 | Maturana et al. | 713/151 |
| 2006/0095969 A1* | 5/2006 | Portolani | H04L 63/0254 |
| | | | 726/23 |
| 2007/0206497 A1* | 9/2007 | Plamondon | H04L 1/1887 |
| | | | 370/231 |
| 2011/0264905 A1* | 10/2011 | Ovsiannikov | H04L 29/08792 |
| | | | 713/151 |

* cited by examiner

HOW PAYLOADS AT DIFFERENT LAYERS IN A
STACK CORRESPOND TO ONE ANOTHER

CONCEPTUAL DIAGRAM OF PROXY ENCRYPTING
ONE BYTE OF THE SSL PAYLOAD

CONCEPTUAL DIAGRAM OF PROXY DECRYPTING
ONE BYTE OF THE SSL PAYLOAD

FIRST DATA STRUCTURE
197

THE MAPPING OF THIS TABLE IS INDEPENDENT OF TCP SEGMENT BOUNDARIES

| TCP SEQUENCE NUMBER FOR THE START OF AN SSL PAYLOAD (IN TCP SEQUENCE SPACE) | START BTYE POSITION FOR THE START OF THE SSL PAYLOAD (IN SSL SEQUENCE SPACE) | SSL PAYLOAD LENGTH |
|---|---|---|
| | | |
| | | |
| | | |
| 37,050 | 25,011 | 30 |
| 37,085 | 25,041 | 37 |
| | | |
| | | |
| | | |

MAPPING OF SSL PAYLOAD LOCATION IN TCP SEQUENCE SPACE TO SSL SEQUENCE SPACE

FIG. 10

SECOND DATA STRUCTURE
198

| START BYTE POSITION (IN SSL SEQUENCE SPACE) | DECRYPT ENGINE STATE (K1 CRYPTOGRAPHIC STATE) | ENCRYPT ENGINE STATE (K2 CRYPTOGRAPHIC STATE) |
|---|---|---|
| 1 | $D_1$ | $E_1$ |
| 25,001 | $D_2$ | $E_2$ |
| 50,001 | $D_3$ | $E_3$ |
| 75,001 | $D_4$ | $E_4$ |

STORED ENCRYPT ENGINE STATE AND DECRYPT ENGINE STATE FOR SELECTED BYTE POSITIONS

FIG. 11

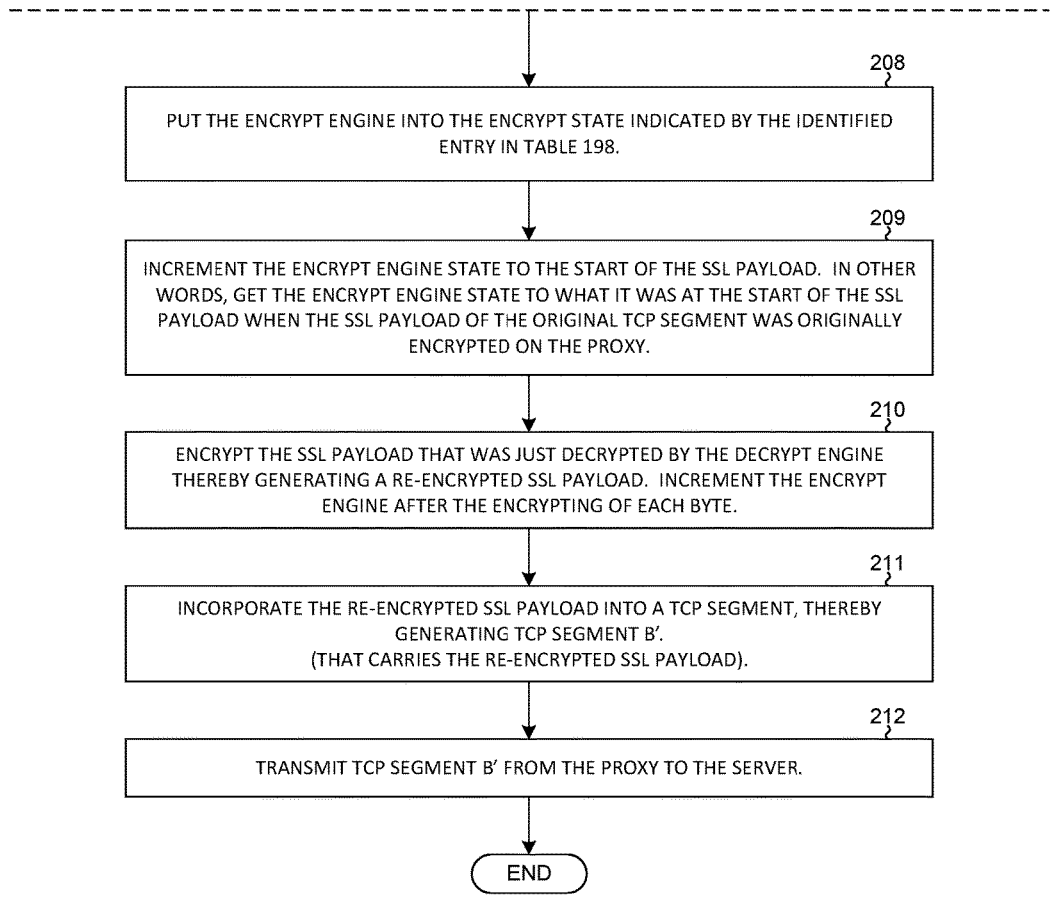
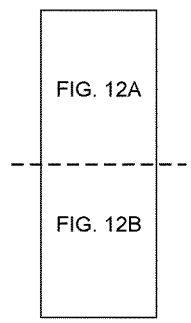
FIG. 12B

THE FORMAT OF SEGMENT B
(SEGMENT B IS COMMUNICATED IN ONE IP PACKET)

EXAMPLE OF A NETWORK DEVICE THAT CAN
CARRY OUT THE METHOD OF FIGURE 12

EFFICIENT FORWARDING OF ENCRYPTED TCP RETRANSMISSIONS

CROSS REFERENCE TO RELATED APPLICATION

This application is a continuation of, and claims priority under 35 U.S.C. § 120 from, nonprovisional U.S. patent application Ser. No. 14/854,046 entitled "EFFICIENT FORWARDING OF ENCRYPTED TCP RETRANSMISSIONS," filed on Sep. 15, 2015, which in turn is a continuation of, and claims priority under 35 U.S.C. § 120 from, nonprovisional U.S. patent application ser. No. 13/737,907 entitled "EFFICIENT FORWARDING OF ENCRYPTED TCP RETRANSMISSIONS," filed on Jan. 9, 2013, and patented as U.S. Pat. No. 9,154,468. The disclosure of the foregoing documents is incorporated herein by reference.

TECHNICAL FIELD

The described embodiments relate generally to TCP retransmissions, and to related devices and methods.

BACKGROUND INFORMATION

A network device referred to as a transparent proxy may be used to intercept network traffic. In a typical example, a transparent proxy device intercepts TCP/IP network traffic communicated between a client device and a server device. The client device may seek to establish a TCP connection with a server device so that application layer payload can be transferred between the client and server devices across the TCP connection. To establish the TCP connection, the client device transmits a TCP SYN segment so as to engage in a conventional three-way SYN, ACK-SYN, ACK handshake with the server device, thereby establishing the TCP connection. The transparent proxy device, however, intercepts the TCP SYN segment, records information about the TCP connection, and then forwards the TCP SYN segment to the server device. In a similar manner the proxy device records the rest of the TCP three-way handshake between the client device and server device, with the purpose of possibly modifying future TCP segments on the TCP connection.

Many times, the application layer payload that is communicated between the client device and the server device is encrypted. An SSL (Secure Sockets Layer) protocol processing layer is disposed above the TCP protocol processing layer and the application protocol processing layer in the TCP/IP stack of each of the client, proxy, and server devices. Accordingly, application layer data communicated out of the client device destined for the server device is encrypted by the SSL protocol processing layer as the information passes down the protocol processing stack in the client device for transmission out of the client device as link layer frames across the TCP connection. Similarly, the link layer frames are received into the proxy device and the information carried passes up the protocol processing stack of the proxy device. The SSL protocol processing layer decrypts the application layer payload. The application layer payload is, however, destined for the server device, so the proxy device passes the application layer payload back down its protocol processing stack for transmission across the second TCP connection to the server device. In contrast to the client device stack and server device stack, the proxy device protocol processing stack takes care not to modify the original boundaries of the different components on each protocol processing layer, unless required for proper functioning of the TCP control loop, which also implies that none of the headers or footers is stripped from any protocol layer, as would be the case when the server device stack or client device stack receives a link layer frame. As the information goes back down the protocol processing stack, the SSL layer encrypts the application layer payload. The information passes across the second TCP connection to the server device in a link layer frame. The frame is received onto the server device, and is processed up the protocol processing stack of the server device to the SSL layer, where the application layer payload is decrypted. The decrypted application layer payload is then made available to the application layer program executing on the server device.

To enable these encryption and decryption operations in the SSL layers of the protocol processing stacks as described above, two SSL sessions are first established. The first SSL session is established between the client device and the proxy device. The establishing of this first SSL session allows the client device and the proxy device to exchange and agree upon the use of certain cryptographic parameters that the two devices will later use to encrypt and decrypt. Likewise, the second SSL session is established between the proxy device and the server device. The establishing of this second SSL session allows the proxy device and the server device to exchange and agree upon the use of certain cryptographic parameters that the two devices will later use to encrypt and decrypt.

The cryptographic parameter sets used in the two SSL sessions are different, but in one example both SSL sessions use a stream cipher. In a stream cipher, the encryption of each successive byte of SSL payload depends on the state of an SSL encryption engine at the end of the encryption of the prior byte. Likewise, the decryption of each successive byte of SSL payload depends on the state of an SSL decryption engine at the end of the decryption of the prior byte.

In the proxy device example, the proxy server may receive from the client device a link layer frame that in turn carries a TCP segment that in turn carries full or partial SSL records. The proxy server may process the TCP segment up its stack to the SSL layer where decryption of the payload of the SSL record occurs in accordance with the first SSL session. Thereafter, the SSL record payload is encrypted in accordance with the second SSL session and is sent back down the stack so that the TCP segment can be forwarded on its way to the server device. The result is that TCP segments sent from the proxy to the server device contain identical TCP sequence numbers in the TCP header, as well as equal TCP payload length, but the TCP payload in the segments might differ because the cryptographic parameter sets for the two SSL sessions might differ. The same holds true for segments sent from the server device to the client device. Consider the situation in which the server device does not receive the TCP segment. The server device will therefore not return an ACK segment to acknowledge receipt. Consequently, the proxy device will not forward the ACK segment back to the client device. If the client device does not receive acknowledgement that the original TCP segment was received, then in accordance with the TCP protocol the client device will retransmit to the TCP segment. In this scenario, the proxy device receives the retransmitted TCP segment and is to send to the server device a retransmission of the same TCP segment that was previously sent out by was not acknowledged. The TCP segment to be sent the second time to the server device is to contain TCP payload identical to that of the TCP segment previously sent but not acknowledged. To support such retransmission requirements in accordance with the TCP protocol, the proxy device stores a copy of all outgoing TCP payload. If the proxy device receives a TCP segment retransmit from the client device, then the proxy device can identify the corresponding outgoing TCP payload, and send a reconstructed TCP segment in a new frame out to the server device. The encrypted SSL payload carried in the reconstructed frame will be identical to the frame not received by the server device, even though the states of the decrypt and encrypt engines of the SSL layer in the proxy device have moved on in their sequences and are no longer in the correct states to regenerate the SSL encrypted content of the retransmit frame.

SUMMARY

A network device, such as a transparent proxy device, receives TCP segments from a client via a first SSL session and transmits TCP segments to a server via a second SSL session. Both SSL sessions use a stream cipher. The TCP segments all are communicated through the network device via a flow of a single TCP connection. Once a TCP segment has been transmitted from the network device to the server, the TCP payload need no longer be stored on the network device. Substantial memory resources of the network device may therefore be conserved, because the network device may be required to handle many retransmit TCP segments at a given time. The transparent proxy device may handle a million flows at a given time. Rather than storing an unacknowledged TCP segment in the event that the unacknowledged TCP segment may later have to be retransmitted to the server, the network device uses the incoming retransmit TCP segment as received from the client to regenerate the retransmit TCP segment as it should be sent to the server. This method may be performed by a transparent proxy device as well as other types of network devices and appliances, and also may be embodied in software such as the network stack of an operating system.

In one specific illustrative example, the network device stores a first data structure and a second data structure. The first data structure includes a number of entries for the flow of the TCP connection, where each entry includes: 1) a TCP sequence number (in TCP sequence space) for a start of an SSL payload, 2) a start byte position for the start of the SSL payload in SSL sequence space, and 3) a length of the SSL payload. There may be multiple entries in this first data structure for a given single TCP segment. The second data structure includes a number of entries for the flow of the TCP connection, wherein each entry includes: 1) a start byte position in SSL sequence space, 2) a decrypt engine state for that start byte position, and 3) an encrypt engine state for that start byte position.

If the network device receives a retransmit TCP segment, then the network device uses the TCP sequence number in the TCP header of the retransmit TCP segment as received (from the client) to identify one of the entries in the first data structure. In one example, the entry identified is the entry whose TCP sequence number (for the start of an SSL payload) is the smallest, and yet is larger than the TCP sequence number from the TCP header. The identified entry indicates a start byte position for an SSL payload carried by the retransmit TCP segment as well as the length of that SSL payload. The start byte position of this identified entry of the first data structure is then used to identify an entry in the second data structure. In one example, the entry identified in the second data structure is the entry whose start byte position is the smallest, and yet is larger than the start byte position from the identified entry of the first data structure. The entry in the second data structure indicates a decrypt engine state and an encrypt engine state. The decrypt engine state is loaded into a decrypt engine of the network device, thereby initializing the decrypt engine. The state of the decrypt engine is then incremented a number of times to correspond to the start position of the SSL payload. The SSL payload of the received retransmit TCP segment is then decrypted, byte by byte, with the decrypt engine being incremented once after each byte is decrypted. The resulting unencrypted SSL payload is then re-encrypted. To re-encrypt the SSL payload, the encrypt engine state from the identified entry in the second data structure is loaded into an encrypt engine of the network device, thereby initializing the encrypt engine. The state of the encrypt engine is then incremented a number of times to correspond to the start position of the SSL payload. The unencrypted SSL payload (as output by the decrypt engine) is then encrypted, byte by byte, with the encrypt engine being incremented once after each byte is encrypted. The resulting re-encrypted SSL payload is then formed into an SSL record, and the SSL payload is passed down the stack of the network device, thereby forming a retransmit TCP segment. The retransmit TCP segment is transmitted via the second SSL session to the server.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 10 is diagram of a first data structure usable to determine, for the TCP sequence number of the start of an SSL payload (in TCP sequence space): 1) the corresponding start byte position of the SSL payload (in SSL sequence space), and 2) the length of the SSL payload.

FIG. 11 is a diagram of a second data structure usable to determine, for each of several start byte positions (in SSL sequence space): 1) the corresponding decrypt engine state, and 2) the corresponding encrypt engine state.

FIGS. 12A and 12B form FIG. 12 which is a flowchart of a method in which a retransmit TCP segment is regenerated by the proxy device rather than the retransmit TCP segment having been stored on the proxy device.

DETAILED DESCRIPTION

Reference will now be made in detail to some embodiments of the invention, examples of which are illustrated in the accompanying drawings.

Figure 1:
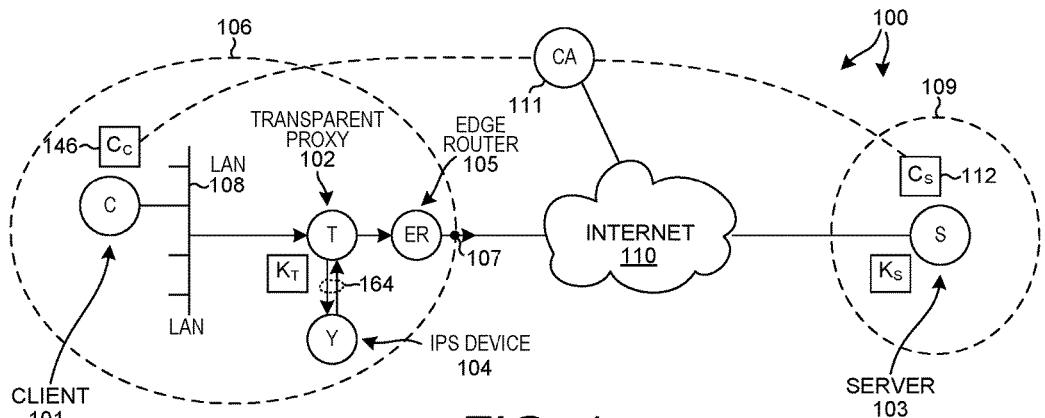
FIG. 1 is a diagram of a system that includes a novel transparent proxy device in accordance with one novel aspect.

FIG. 1 is a diagram of a system 100 that includes a novel transparent proxy device in accordance with one novel aspect. System 100 includes a first network device 101, a second device network device 102, a third network device 103, a fourth network device 104, and a fifth network device 105. In this example, first network device 101 is a client device, second network device 102 (also referred to as a network appliance) is the novel transparent proxy device, third network device 103 is a server device, fourth network device 104 is an IPS (Intrusion Prevention System) and recording device, and fifth network device 105 is an edge router. Dashed line 106 represents the boundary of a first company or organization. Dot 107 identifies an edge of the network of the first organization through which communications between the company 106 and the internet 110 pass. Client device 101 can communicate with the proxy device 102 and other devices of the first organization via a Local Area Network (LAN) 108. Dashed line 109 represents a second company or organization. The client device 101 and the server device 103 can communicate through the internet 110 with each other and with a trusted third party device 111. The trusted third party issues a server certificate $C_S$ 112 that is provided to server device 103. The trusted third party provides to client device 101 a publicly available digital X.509 root CA certificate $C_C$. Most browsers come with a preconfigured certificate store that contains known, trusted root CA certificates, of which $C_C$ is one.

In one operational example, a user of client device 101 uses a web browser application layer program 113 to interact with a web mail server application layer program 114 executing on server device 103. The user does this to initiate composition of an email. As a result, the TCP (Transmission Control Protocol) protocol processing layer 115 of the stack 120 on the client device 101 and a TCP protocol processing layer 116 of the stack 130 executing on the server device 103 engage in a three-way handshake process to establish a TCP connection 117 between the client device 101 and the proxy device 102, thereby creating two flows 118 and 119 of IP (Internet Protocol) packets. Each flow has its own TCP sequence space. IP packets of the first flow 118 are identified to be of the flow by a so-called 5-tuple: 1) a TCP source port on client device 101 identified with the web browser application layer program 113, 2) the IP source address that identifies the client device 101, 3) a TCP destination port on the server device 103 identified with the web mail server application layer program 114, 4) the IP destination address that identifies the server device 103, and 5) the higher layer protocol (TCP).

IP packets of the second flow 119 are identified to be of the flow by a so-called 5-tuple: 1) a TCP source port on server device 103 identified with the web mail server application layer program 114, 2) the IP source address that identifies the server device 103, 3) a TCP destination port on the client device 101 identified with the web browser application layer program 113, 4) the IP destination address that identifies the client device 101, and 5) the higher layer protocol (TCP). There are other ways of identifying a flow. This 5-tuple way is but one way.

Figure 2:
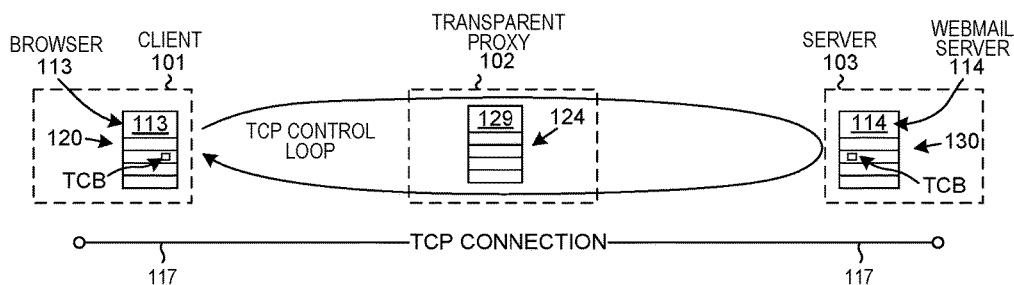
FIG. 2 is a diagram that shows the TCP connection formed between the client device of FIG. 1 and the server device, with the proxy device intercepting frames on the TCP connection.
Figure 3:
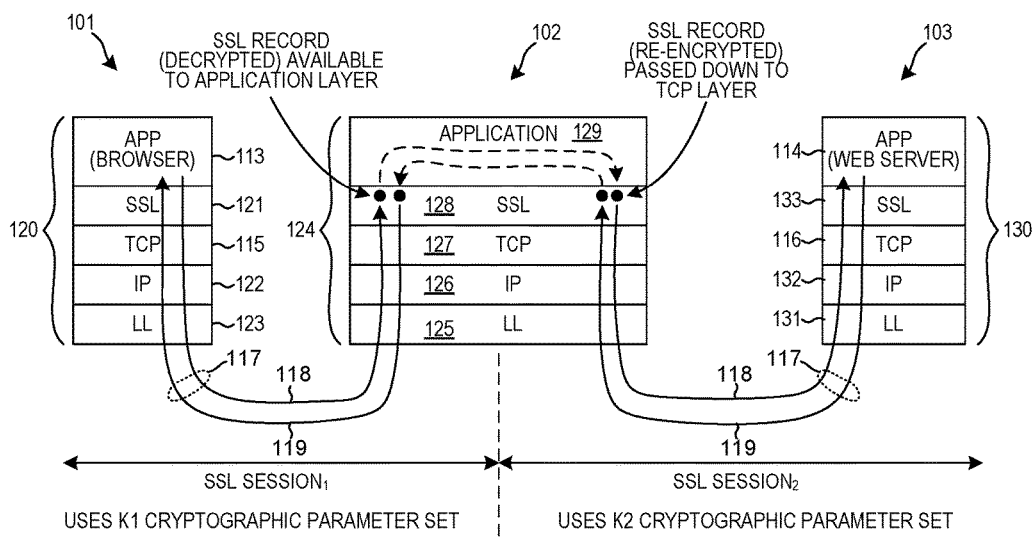
FIG. 3 is a diagram that shows the TCP connection and the stacks in the proxy, client and servers devices in more detail.

FIG. 2 is a diagram that shows this TCP connection 117 between the client device 101 and the server device 103. The browser is the application layer program 113 of the stack 120 in client device 101. As indicated in FIG. 3, stack 120 includes the browser application layer program 113, an SSL protocol processing layer 121, the TCP protocol processing layer 115, an IP protocol processing layer 112, and a link layer protocol processing layer 123. As indicated in FIG. 3, stack 124 includes an application protocol processing layer 129, an SSL protocol processing layer 128, the TCP protocol processing layer 127, an IP protocol processing layer 126, and a link layer protocol processing layer 125. Reference numeral 130 identifies the stack in the server device 103. Reference numeral 114 identifies the web mail server application layer program of the stack 130. Stack 130 includes an SSL protocol processing layer 133, a TCP protocol processing layer 116, an IP protocol processing layer 132, and a link layer protocol processing layer 131.

Figure 4:
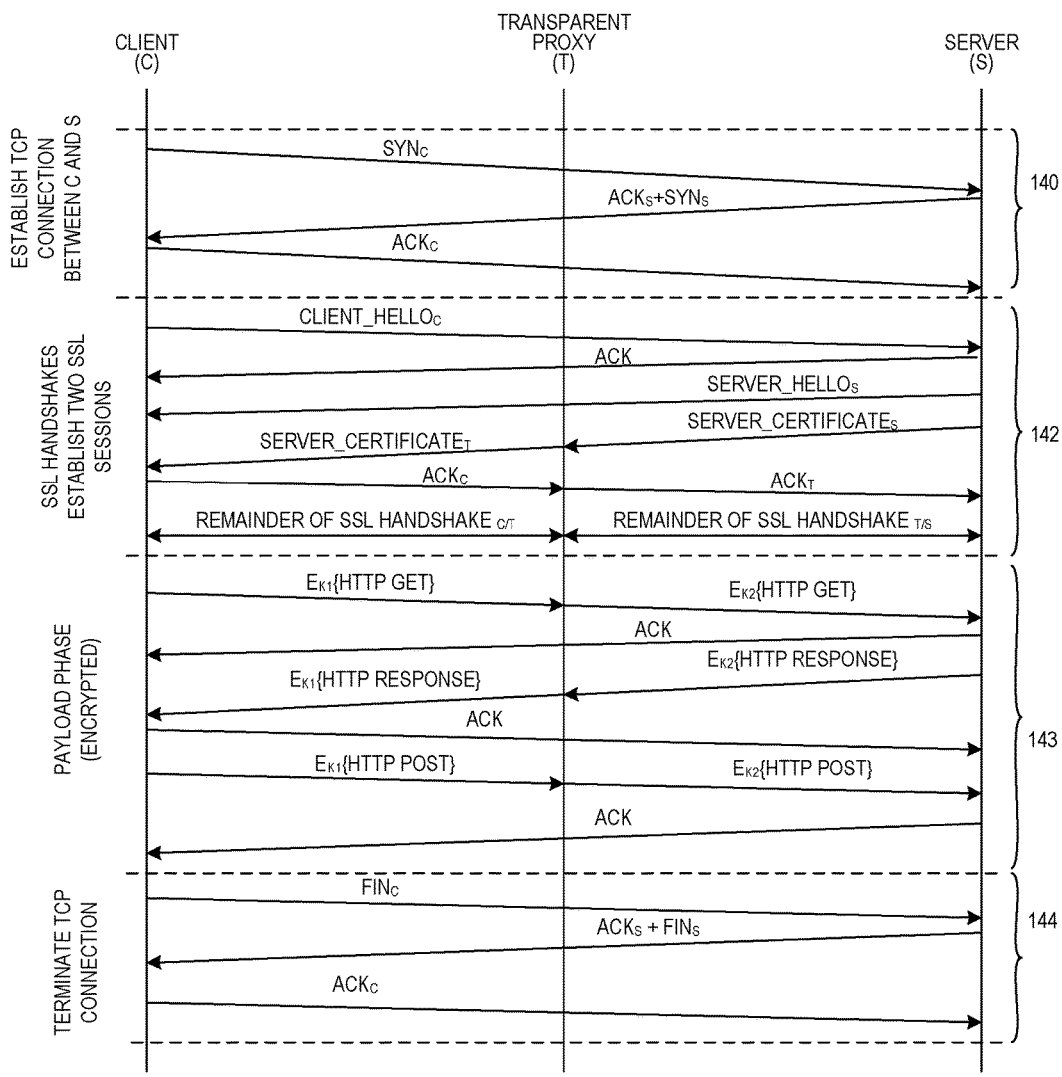
FIG. 4 is a diagram that shows messaging passing back and forth between the proxy device and the client device and the server device in an operational example of the system of FIG. 1.

FIG. 4 is a diagram that illustrates communications between the client device 101, the proxy device 102 and the server device 103 of FIG. 1. The three-way handshake that results in the establishment of the TCP connection 117 occurs during time period 140. To establish this TCP connection 117, the client device 101 first sends the server device 103 a TCP SYN segment. This SYN segment of the first flow 118 passes from the TCP layer 115 of stack 120, down through the various network processing layers of stack 120, then across LAN 108 to proxy device 102 in the form of an IP packet that is carried in a link layer frame.

Figure 5:
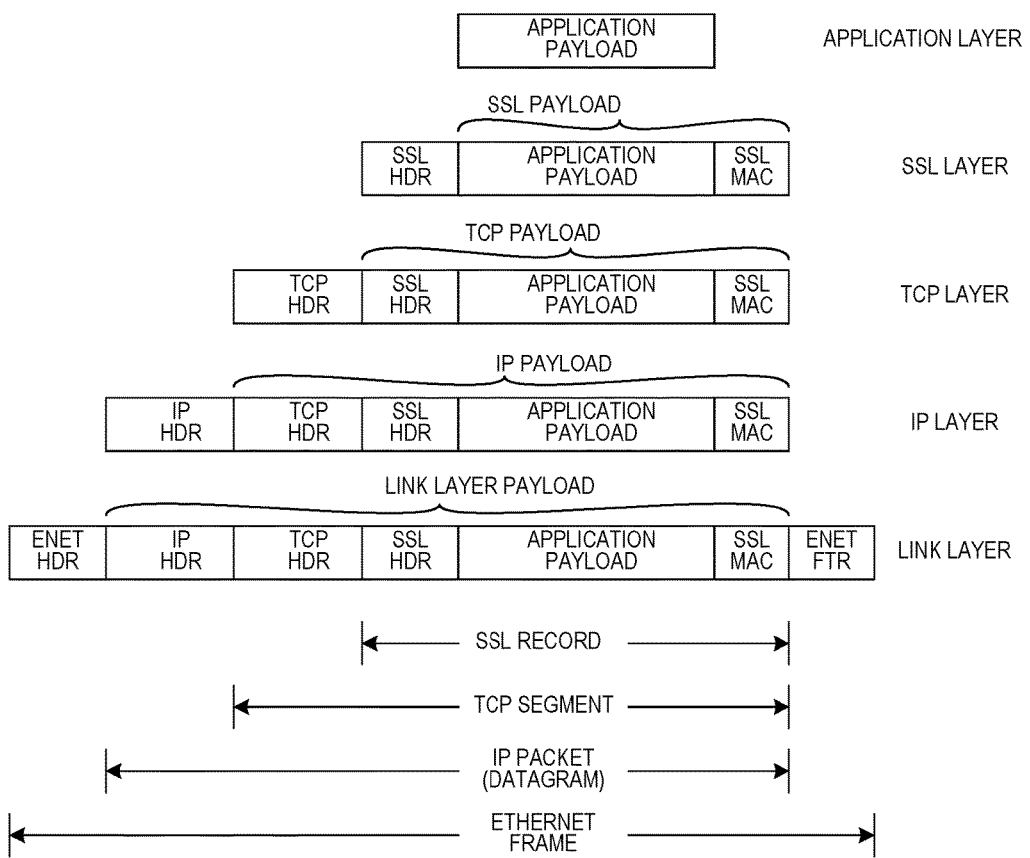
FIG. 5 is a diagram that shows how an amount of application layer payload is carried in packets as each protocol processing layer of a stack adds a header onto the packet passed to it by the preceding protocol processing layer.

FIG. 5 shows the format of a link layer frame. The frame includes an IP packet, that in turn includes a TCP layer segment. At this point in the TCP connection establishment handshake, no SSL session has been established so there is no SSL header or SSL message authentication code (MAC).

As indicated in FIG. 4, the proxy device 102 receives the SYN segment and responds by forwarding the SYN segments to server device 103. Server device 103 responds with a SYN-ACK segment to acknowledge receipt of the first SYN segment from the client device, and is also to send a SYN to the client device. The SYN-ACK segment of the second flow 119 passes down the protocol processing layers of stack 130 of the server device, is encapsulated into an IP packet, and is communicated in a link layer frame back to the client device 101. In response, the client device 101 acknowledges receipt of the SYN portion of the SYN-ACK segment by sending an ACK segment back to the server device 103. This three-way handshake results in the TCP connection 117 being established, with a corresponding TCP control loop between the client device 101 and server device 103.

All link layer frames sent from client device 101 and server device 103 pass through stack 124 in proxy device 102, where the frames can be modified by proxy device 102. Because the communication between the client device and the server device is to be encrypted in accordance with the SSL protocol, the client device 101 initiates establishment of an SSL session by transmitting a CLIENT_HELLOC message. As shown in FIG. 4, however, the proxy device 101 records this CLIENT_HELLOC message and forwards the CLIENT_HELLOC message to server device 103. As shown in FIG. 4, the proxy device interacts with the client device to establish a first SSL session, and the proxy device also interacts with the server device to establish a second SSL session. (The term SSL as it is used in this patent document is a general term that refers to any member of the family of SSL, TLS (Transport Layer Security) and WTLS (Wireless Transport Layer Security) related protocols, including for example SSL 2.0, SSL 3.0, TLS 1.0, TLS 1.2 and WTLS 1.1.) The two SSL sessions are established during time period 142 as shown in FIG. 4.

As part of an SSL establishment handshake, the two devices that wish to communicate using the SSL session agree on a cryptographic parameter set that will be used during the SSL session. In the case of the first session between client device 101 and proxy device 102, this cryptographic parameter set is denoted K1. K1 is not an individual key, but rather is a set of cryptographic parameters which include: encrypt and decrypt keys, encrypt and decrypt initialization vectors, and MAC secrets. How to calculate K1 is described in detail in the SSL specification. During the SSL session establishment handshake process, the client device of the SSL session advertises a list of cipher suites that it can use. The server device of the SSL session responds by indicating that it has picked one of the advertised cipher suites. The cipher suite indicates a key exchange algorithm as well as a cipher. The key exchange algorithm is used to calculate encryption and decryption keys. The cipher is a function used to encrypt and decrypt data. In the example of FIG. 4, the two SSL sessions use different cryptographic parameter sets K1 and K2. Whereas K1 and K2 refer to the session parameter sets used in symmetric encryption of SSL record payloads, $K_T$ and $K_S$ (see FIG. 1) refer to asymmetric private keys (e.g. RSA private keys) used only in the SSL handshake. K1 and K2 are different for every SSL session. $K_T$ and $K_S$, on the other hand, do not change unless the server device is reconfigured. $K_S$ is installed on the server device as part of server configuration. $K_T$ is installed on the proxy device a part of the SSL rule set configuration.

Once an SSL session has been established, the client device and the server device can exchange information across the secure SSL link. In the email example being described in connection with FIGS. 1-4, an email will be sent out of the client device 101 to the server device 103. Accordingly, as shown in FIG. 4, the web browser 113 outputs a HTTP GET application layer message. This HTTP GET application layer message is a request that the web mail server 114 return a Tillable form. The SSL layer 121 of stack 120 encapsulates the HTTP GET in encrypted SSL records using cryptographic parameter set K1, which was negotiated between client device 101 and proxy device 102 during time period 142. The SSL records are processed down the stack 120 in the client device 101 and are communicated (within frames) to proxy device 102. In the proxy device 102, the information passes up the stack 124. In the SSL layer 128, the payloads of the SSL records are decrypted. The payloads are assembled and ultimately passed as HTTP GET application layer data up to the application layer program 129. In the proxy device here, however, the application need not examine the entire application layer payload as a unit. Rather, the SSL payloads of the individual SSL records of the HTTP GET message are passed one by one right back down the stack 124 of the proxy device. The SSL payloads of the SSL records are encrypted, this time using cryptographic parameter set K2. The SSL records are formed into TCP segments and IP packets and then at the lowest level in the stack 124 into frames. The frames are sent from the proxy device 102 to the server device 103.

Figure 6:
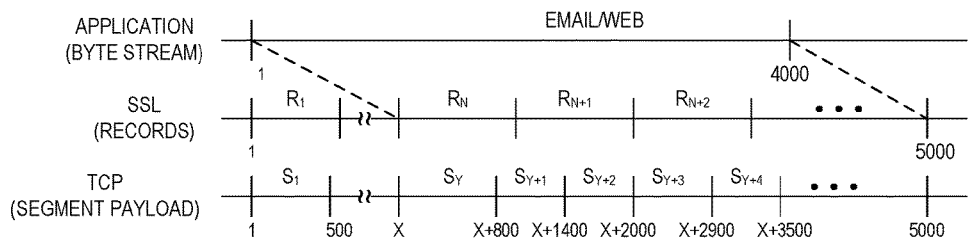
FIG. 6 is a diagram that illustrates how the boundaries of SSL record payload on the SSL layer do not align with TCP segment boundaries on the TCP layer.

FIG. 6 is a diagram that illustrates how the application layer payload, such as an email payload of an HTTP (Hypertext Transfer Protocol) message, is sectioned up into smaller pieces of information, each of which becomes part of the SSL payload of an SSL record. The SSL payload of each SSL record is encrypted. The resulting SSL records are further sectioned up and formed into TCP segments. Each TCP segment is encapsulated with an IP header and becomes an IP packet. The IP packets are carried in link layer frames. When the link layer frames are received, the link layer and IP layer headers are removed such that the IP payloads form TCP segments. The SSL protocol processing layer then extracts SSL payloads from the TCP segments and reassembles SSL records. A TCP segment can include one SSL record, multiple SSL records, part of an SSL record, or no SSL record at all. An SSL record includes the following components: an SSL record header (which encodes the length of the record, from 0 to 18432 octets), an SSL record payload, and an SSL record MAC (a footer). SSL payload can be decrypted before the full SSL record is available. Once the SSL protocol processing layer has a full SSL record it is able to verify the SSL record payload using the SSL record MAC. After decryption, the decrypted SSL payload is passed up to the application layer. The decrypted payload portions of SSL records are combined to form the application layer payload. Note from FIG. 6 that the boundaries of the TCP segment payloads do not have to align with the boundaries of the SSL records.

In the present example, an email is to be sent out of the company 106 across an encrypted link to the Google email (web mail) application layer program 114 executing on server device 103. The encrypted IP packets that will be carrying the email, however, will be intercepted by proxy device 102. The SSL layer payload carried by the stream of IP packets will be decrypted, and the decrypted SSL layer payload will be forwarded to the IPS recorder device 104 for future reference and analysis. FIG. 1 shows the IPS recorder device. The IPS recorder device 104 performs TCP reassembly, but not TCP termination. There is no TCP control loop between T and Y. Arrows 164 represent a stream of IP packets used to reconstruct the decrypted email message.

As shown in FIG. 4, server device 103 receives an IP packet or packets, and recovers the HTTP GET application layer message from the SSL records. The notation $E_{K2}\{\text{HTTP GET}\}$ in FIG. 4 indicates that the HTTP GET application layer message was encrypted by the proxy device using the K2 cryptographic parameter set. The web mail server program 114 of the server device 103 responds by sending the requested form as part of an HTTP RESPONSE message. The HTTP RESPONSE message passes back down the stack 130 of the server device 103 and is communicated to the proxy device 102. The notation E$_{K2}${HTTP RESPONSE} indicates that the HTTP RESPONSE application layer message was encrypted by the server device using the K2 cryptographic parameter set. The proxy device 102 receives the IP packets, reassembles the SSL records, decrypts the SSL payloads, and ultimately reassembles the application layer data HTTP RESPONSE. The HTTP RESPONSE message is made available to the application layer program 129 executing on the proxy device. The HTTP RESPONSE message passes back down the stack 124 of the proxy device, is encapsulated in SSL records using cryptographic parameter set K1, and is carried in IP packets within frames to the client device 101. In FIG. 4, the notation E$_{K1}${HTTP RESPONSE} indicates that the HTTP RESPONSE application layer message was encrypted by the proxy device using the K1 cryptographic parameter set. In the client device, the SSL records are reassembled, their payloads are decrypted using the K1 cryptographic parameter set K1, and the resulting decrypted SSL payloads are assembled to recover the HTTP RESPONSE. The HTTP RESPONSE is presented to the web browser application layer program 113. The HTTP RESPONSE contains a fillable form. The web browser 113 renders the fillable form on a display to the user. The fillable form has a field into which the user can type an email message. The user types an email message into the field, and then selects a submit button using the browser. In response to the selecting of the submit button, the browser 113 sends an HTTP POST message to the proxy device 102. The HTTP POST is presented in unencrypted form up to the application layer 129 program executing on the proxy device. This HTTP POST includes the body of the email in unencrypted form. As mentioned above, the particular application program 129 executing on the proxy device 102 need not receive the entire application layer payload as a unit. Individual SSL record payloads pass through the application layer program 129 one by one.

In the illustrated example, the proxy device 103 sends the unencrypted SSL messages that carry the email content from proxy server 102 via a dedicated physical link 164 to the IPS device 104, where the IPS device can inspect the email content before passing it back to the proxy device 102. After inspection, the HTTP POST application layer data (that includes the body of the email) is passed back down the stack of the proxy device 102, and is communicated as encrypted (using cryptographic parameter set K2) SSL records in IP packets within link layer frames to the server device 103. The information is processed up the stack 130 of the server device 103 so that the HTTP POST is presented to the web mail server application layer program 114. At this point in the method, communication of the email from the client device 101 to the server device 103 is complete, but due to the intervening proxy device 102 the proxy device 102 decrypted messages passing across the SSL secure link and forwarded the messages in unencrypted form to the IPS device 104 for recording and analysis. One of these messages contained the body of the email. Communication of the email occurred during the payload phase time period 143 of FIG. 4.

After the email has been communicated from client device 101 and server device 103 during time period 143, then either the client or the server will initiate termination and tear down of the TCP connection when the TCP connection is no longer needed. Termination of a TCP connection is initiated by the sending of a FIN segment from either the client or server. The other endpoint then responds and sends its own FIN segment. In the illustrated example, client device 101 initiates termination of TCP connection 117 which occurs during time period 144 as shown in FIG. 4.

Figure 7:
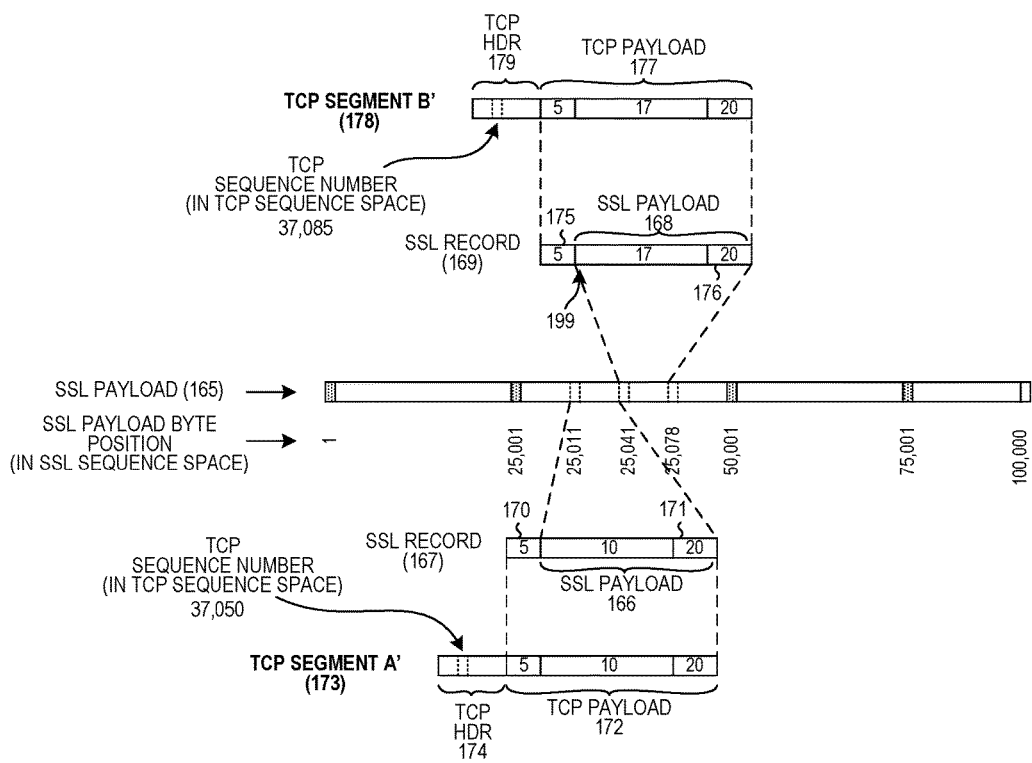
FIG. 7 illustrates the overall SSL layer payload of the encrypted HTTP POST message that carries the email body in the example of FIG. 4.
Figure 8:
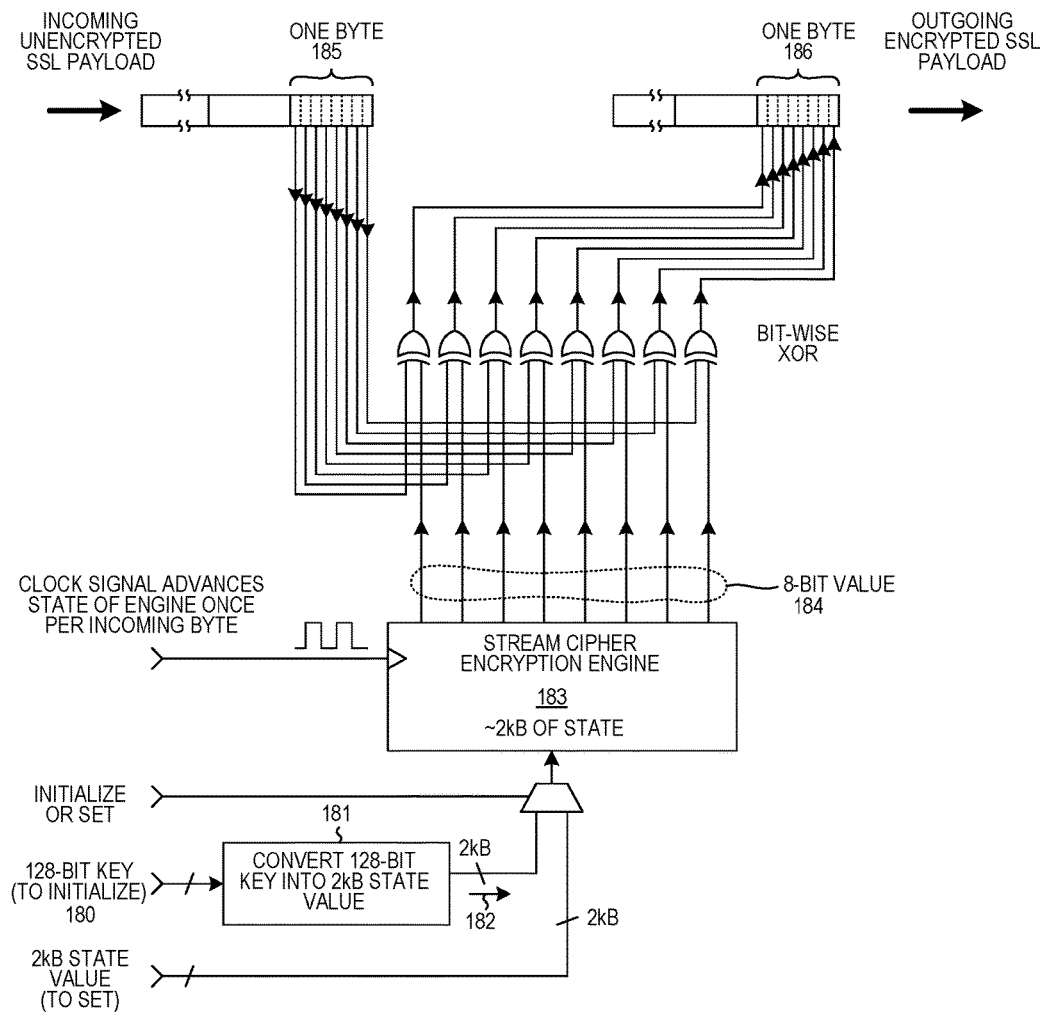
FIG. 8 is a conceptual diagram of how the proxy device encrypts one byte of the SSL payload.
Figure 9:
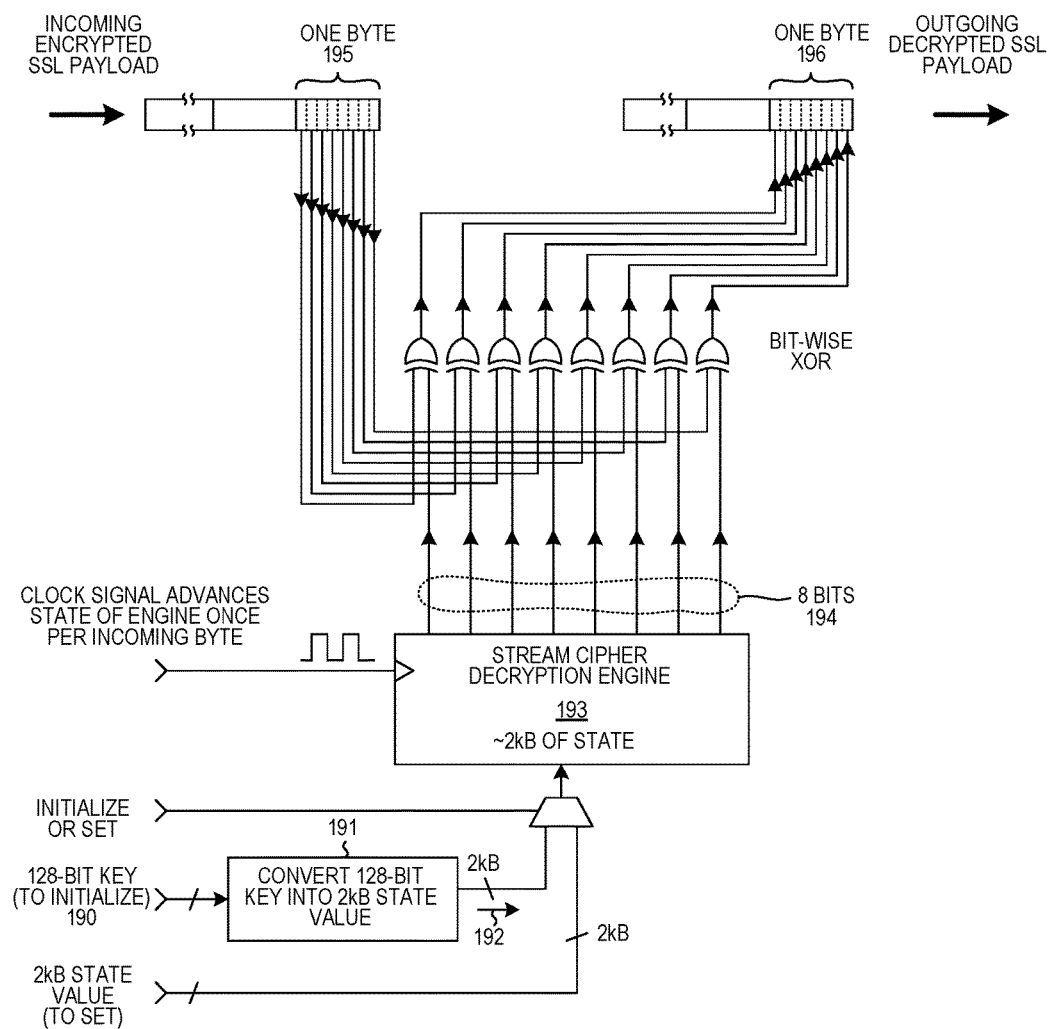
FIG. 9 is a conceptual diagram of how the proxy device decrypts one byte of the SSL payload.

FIGS. 7, 8 and 9 illustrate the SSL decryption and SSL encryption process in further detail. FIG. 7 shows an example of the overall SSL layer payload 165 of the encrypted HTTP POST application layer message. The horizontal bar 165 represents the entire payload, with the first byte being shown at the left and with the last byte being shown at the right. The first byte has a byte number of "1" in this simplified example. The last byte has a byte number of "100,000" in this simplified example. In the illustration of FIG. 7, SSL record 167 is comprised of SSL header 170 and SSL payload 166, together forming TCP payload 172. SSL payload 166 is comprised of 10 application layer payload bytes and 20 bytes in SSL record MAC 171, and corresponds with bytes 25011 to 25040 of the overall payload 165. Similarly SSL record 169 is comprised of SSL header 175 and SSL payload 168, together forming TCP payload 177. SSL payload 168 is comprised of 17 application layer payload bytes and 20 bytes in SSL record MAC 176, and corresponds with bytes 25041 to 25077 of the overall SSL payload 165. All the other bytes of the application layer data are carried in SSL records as well, but these other records are not illustrated in FIG. 7. To form a TCP segment 173, a TCP header 174 is added to the front of the TCP payload 172 as illustrated. The TCP segment 173 is then encapsulated at the IP layer, and the IP packet is encapsulated at the link layer as illustrated in FIG. 5. Only the SSL payload portion of the SSL record is encrypted. In a like fashion, to form a TCP segment 178, a TCP header 179 is added to the front of the TCP payload 177. In the particular example of FIG. 7, TCP segment A' 173 and TCP segment B' are segments as they are sent from proxy device 102 to server device 103.

FIG. 8 is a conceptual diagram of the proxy device encrypting one byte of the SSL payload. Initially, at the beginning of the SSL session, the 128-bit encrypt key 180 that comes from the cryptographic parameter set negotiated during SSL establishment is converted 181 into about 2k bytes of cryptographic state 182. This 2k bytes of cryptographic state 182 initializes encryption engine 183. The encryption engine 183 then outputs an eight bit value 184. A first byte 185 of the SSL payload to be encrypted is bit-wise exclusive-ORed with the eight bit value 184 output from the encryption engine, thereby outputting eight encrypted bits 186. These eight encrypted bits are the first byte of the encrypted SSL payload. Next, the state of the encryption engine 183 is incremented, and as a result the encryption engine outputs another eight-bit value. The second byte of SSL payload to be encrypted is bit-wise exclusive-ORed with the eight-bit value output by the encryption engine, thereby generating a second encrypted byte of SSL payload. The process proceeds byte by byte, through the bytes of the SSL payload. Even though the smaller chunks of the overall application layer data are carried by SSL records having SSL headers, and are contained in TCP segments having TCP headers, the encryption engine is only incremented for those bytes that are to be encrypted, namely the SSL payload bits. The state of the encryption engine 183 therefore corresponds to, but does not increment in exact correspondence with, the succession of bits of the application layer payload or TCP payload.

FIG. 9 is a conceptual diagram of the proxy device decrypting one byte of the SSL payload. Initially, at the beginning of the SSL session, the 128-bit decrypt key 190 that comes from the cryptographic parameter set negotiated during SSL session establishment is converted 191 into about 2 k bytes of cryptographic state 192. This 2 k bytes of cryptographic state 192 initializes decryption engine 193. The decryption engine 193 then outputs an eight bit value 194. A first byte 195 of the SSL layer payload to be decrypted is bit-wise exclusive-ORed with the eight bit value 194 output from the encryption engine 193, thereby generating eight unencrypted bits. These eight unencrypted bits are the first unencrypted byte 196 of the SSL payload. Next, the state of the decryption engine 193 is incremented, and as a result the decryption engine outputs another eight-bit value. This next eight-bit value is used to decrypt the next encrypted byte of the incoming SSL payload. This process is repeated, from byte to byte, through the bytes of the SSL records to be decrypted. The decryption engine 193 is not incremented for SSL header bits of SSL records, even though the incoming SSL records contain encrypted payload. Likewise, the state of the decryption engine 193 is not incremented for bits of the TCP headers that carry the SSL records.

Regenerate a Retransmit Segment as Previously Output from the Proxy:

In accordance with the TCP protocol, as part of the TCP control loop on the TCP connection, if a transmitter sends a TCP segment to a receiver but the transmitter does not receive an acknowledgement in return, then the transmitter may retransmit the TCP segment to the receiver. In the example being described above in connection with FIGS. 1-4, a TCP segment is transmitted by client device 101 to server device 103. The SSL layer of the stack of the proxy device 102 intercepts and decrypts the SSL record payload of the transmitted TCP segment using the K1 cryptographic parameter set. The resulting unencrypted application layer payload, along with an appropriate SSL footer, is then re-encrypted using the K2 cryptographic parameter set. An SSL header is added to form an SSL record. The SSL record is passed down the stack so that a TCP segment is formed that contains the SSL record. The TCP segment is encapsulated into an IP packet, and the IP packet is communicated to the server device in the form of a link layer frame. Assume for this example that the server device does not receive the TCP segment. The server device will therefore not send the client device back an acknowledgement (ACK). After an amount of time, the client device will send to the server device a "retransmit" TCP segment. This retransmit TCP segment will be a copy of the originally sent TCP segment for which the client device received no ACK. The TCP sequence number in the TCP header of the retransmit segment will be the same as the TCP sequence number in the originally transmitted TCP segment. The intercepting proxy device is then to send to the server device the very same TCP segment that the proxy device had previously sent to the server device (the TCP segment that was not ACKed). Unlike the proxy device described above in the background section of this patent document, the proxy device does not store copies of TCP segments in the form they were previously sent out to the server device just so that if a TCP segment were later not ACKed that the proxy device would be able to send the copy on to the server device. In accordance with one novel aspect, rather than sending out a copy, the proxy device uses the TCP sequence number of the incoming retransmitted TCP segment (as received on retransmit from the client device) to determine the byte number (in SSL sequence space) in the overall SSL layer payload where the start of the encrypted SSL payload carried by the retransmitted segment is found in the TCP segment payload. In the diagram of FIG. 7, if the proxy device received a retransmit of TCP segment 178, then the proxy device determines from the TCP sequence number in the TCP header 179 of the retransmit TCP segment 178 that the corresponding byte number in SSL sequence space (the byte number of the starting byte to be decrypted) is byte 25,041. Note that starting at byte 25,041, there are 37 bytes of SSL payload being carried in the retransmitted TCP segment 178. These 37 bytes are the bytes from 25,041 to 25,077 in the overall SSL layer payload 168.

FIG. 10 is a diagram of a first data structure 197 that is stored in proxy device 102. In FIG. 10, the first data structure 197 is illustrated as a table. The table maps TCP sequence numbers in TCP sequence space (that mark the start of SSL records) to the start byte positions of the SSL records (in SSL payload sequence space), and also stores the length of the corresponding SSL record payload. The mapping represented by the entries in table 197 is independent of TCP segment boundaries. The TCP sequence numbers in the table do not necessarily correspond to the start of TCP payload in specific TCP segments, as was shown in FIG. 6. A given TCP segment may contain one SSL record, multiple SSL records, or part of an SSL record, or no SSL record. The start of the SSL record within a TCP segment may also be offset from the beginning of the TCP segment by varying amounts. Accordingly, there may be multiple rows in table 197 of FIG. 10 for SSL records of the same TCP segment.

In the example being described here where TCP segment 178 of FIG. 7 is to be retransmitted, the TCP sequence number (that identifies the start of the SSL record carried in the TCP segment) of the retransmit TCP segment 178 is 37,085. The table 197 of FIG. 10 indicates that TCP sequence number 37,085 corresponds to byte position 25,041 in the overall SSL layer payload 165 and has SSL payload length of 37 bytes. FIG. 7 also shows the correspondence between the TCP sequence number 37,085 of TCP segment 178 and byte position 25,041 (in SSL sequence space) in the application layer payload 165. Table 197 is updated every time a new SSL record is intercepted by proxy device 102, and the information in the table is derived from the TCP segment containing the SSL record header, as well as from the SSL record length encoded in the SSL record header.

FIG. 11 is a diagram of a second data structure 198 that is stored in proxy device 102. In FIG. 11, the second data structure 198 is illustrated as a table. For each of four different start byte positions in the SSL layer payload, the table 198 stores the corresponding encryption engine state and the corresponding decryption engine state. These four start byte positions in this example are 1, 25,001, 50,001 and 75,001. In the illustrated example, the start byte positions are not static, but rather are dynamically adjusted based on: 1) the number of SSL payload bytes received so far by proxy device 102, and 2) the TCP sequence number of the ACKed TCP segment having the largest TCP sequence number in its TCP header. The number of entries present in table 198 may change as TCP segments are communicated across the flow of the TCP connection, and certain start byte position entries may be removed and may be replaced with other start byte position entries. The entries in table 198 are adjusted in this way to reduce the amount of advancing of SSL state required to handle a retransmission event, while at the same time keeping the amount of memory space used to store decrypt/ encrypt state values within acceptable limits. The smallest SSL payload start byte position in table 198 must be equal to or smaller than the smallest SSL payload start byte position in table 197, and correspondingly the largest SSL payload start byte position in table 198 must be equal to or smaller than the largest SSL payload start byte position in table 197. Each of the encryption state and decryption state values is a long number of approximately 2k bytes. The four byte positions are shown as shaded blocks in FIG. 7. Each such block in FIG. 7 represents one byte.

Note that the four shaded byte positions do not correspond to the beginnings of TCP segments, but rather are fairly evenly spaced in the overall SSL layer payload sequence space. In the example being described here, at a given time there may be substantially more unacknowledged TCP segments that were transmitted from the network appliance to the server 103 across flow 118 of the TCP connection 117 than there are entries in table 198 of FIG. 11.

The proxy device 102 looks in table 198 of FIG. 11 for the entry whose SSL layer payload start byte position is the closest to the start byte position determined from the table of FIG. 10, while being smaller than or equal to the start byte position determined from the table of FIG. 10. In the present example where the start byte position determined from the table of FIG. 10 is 25,041, the payload start byte position entry in the table of FIG. 11 that is the closest to 25,041 without being larger than 25,041 is the start byte position 25,001. The corresponding decrypt state and encrypt state values are denoted D2 and E2 in FIG. 11. The decrypt engine state D2 is loaded into the decrypt engine 193 of FIG. 9, and the decrypt engine is advanced (fast-forwarded) 40 bytes to byte position 25,041. The decrypt engine 193 now has the correct cryptographic state to decrypt the first encrypted byte of the SSL payload carried by retransmitted TCP segment 178. This first byte is indicated in FIG. 7 by reference numeral 199. This byte 199 to be decrypted was not stored on the proxy device, but rather was received again as part of the retransmitted TCP segment 178 from the client device. After this first byte 199 has been decrypted, the decrypt engine 193 of FIG. 9 is incremented, and the next byte of the SSL payload carried by TCP segment 178 is decrypted. All 37 SSL payload bytes 168 of the TCP payload 177 of the retransmitted TCP segment 178 are decrypted in this way, with the decryption engine 193 being incremented after the decrypting of each successive byte.

Next, the encrypt state E2 stored for the 25,001 entry in the table 198 of FIG. 11 is loaded into the encrypt engine 183 of FIG. 8, and the encrypt engine is incremented (fast-forwarded) 40 bytes to byte position 25,041. The encrypt engine 183 now has the correct cryptographic state to re-encrypt the first unencrypted SSL payload byte (that was just decrypted). After the first unencrypted SSL payload byte has been re-encrypted, the encryption engine is incremented, and the second unencrypted SSL payload byte is encrypted. Encryption proceeds in this way until the 37 SSL payload bytes (that were just decrypted using the decryption engine 193 of FIG. 9) are re-encrypted using the K2 cryptographic parameter set. Once the re-encrypted SSL payload has been determined, these bytes are incorporated into an SSL record. The resulting SSL record is passed down the stack of the proxy device. A TCP header is added, and the resulting TCP segment is encapsulated into an IP packet, and into a link layer frame. The resulting recreated TCP segment B' has identical TCP payload to the originally transmitted TCP segment B' 178 that was not ACKed. The resulting recreated TCP segment B' is sent from the proxy device 102 to the server device 103 as the retransmitted TCP segment B'.

Figure 12A:
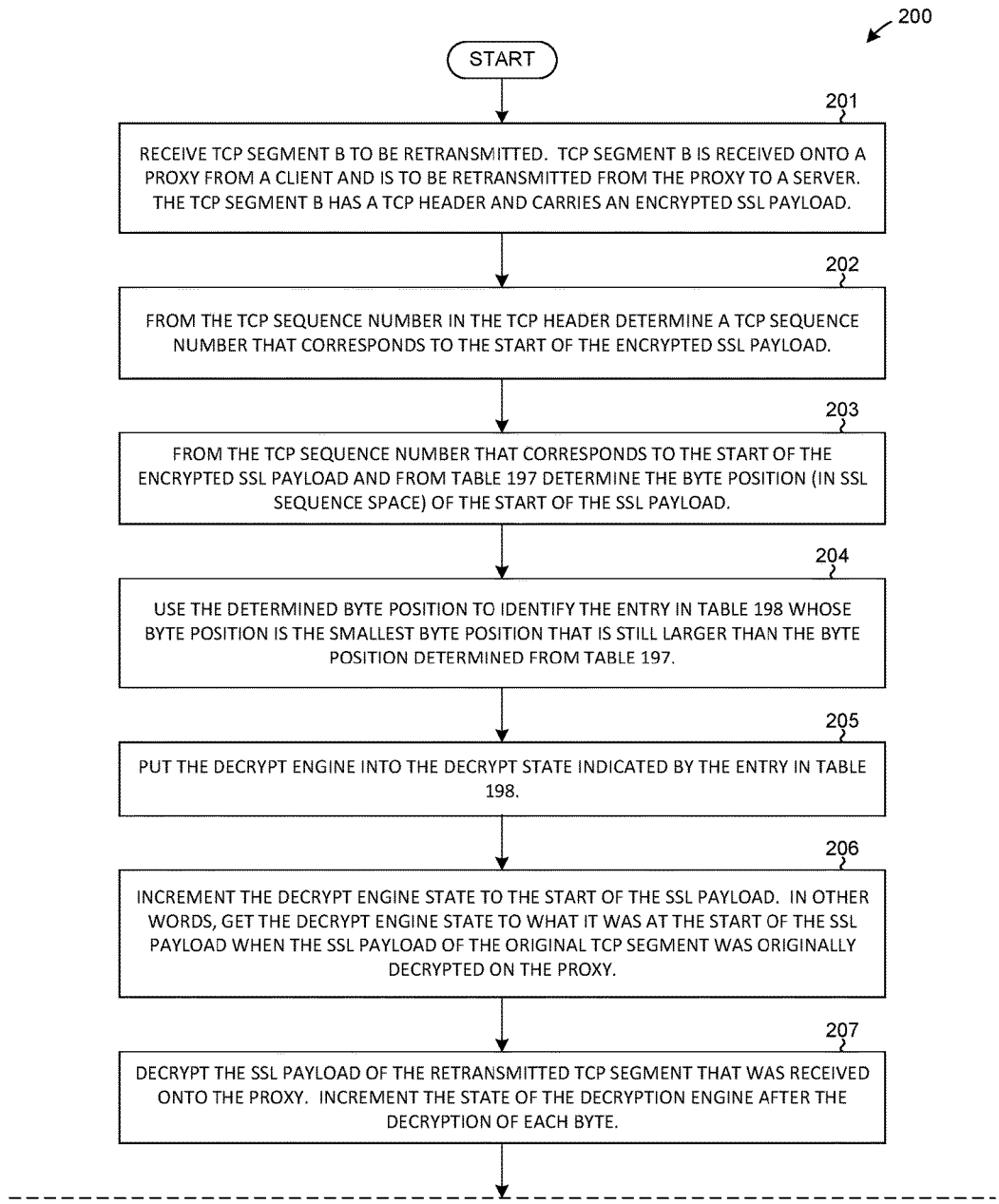
Figure 13:
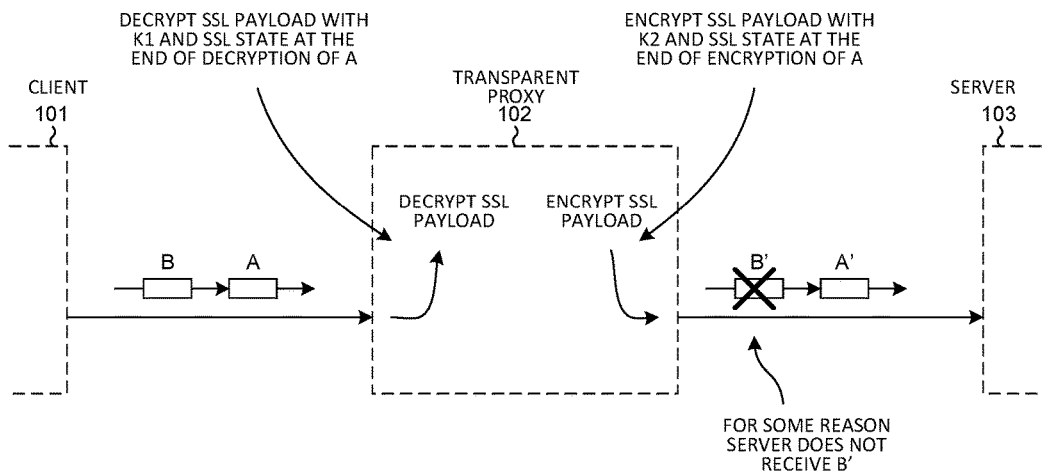
FIG. 13 is a diagram that shows two TCP segments being communicated through the proxy device in the method of FIG. 12.
Figure 14:
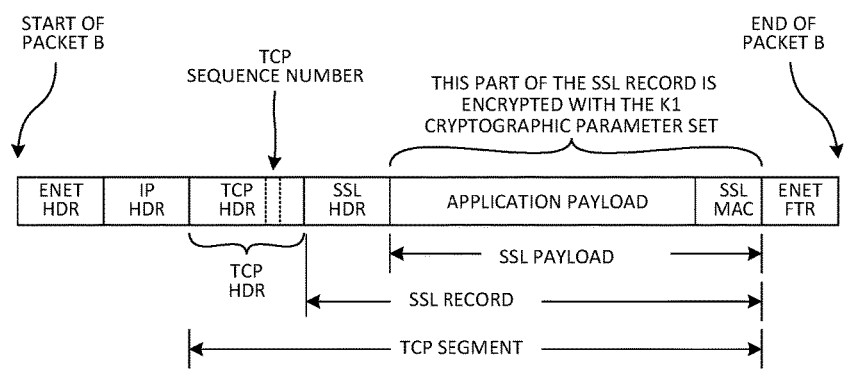
FIG. 14 is a diagram of one of the TCP segments communicated through the proxy device in the method of FIG. 12.
Figure 15:
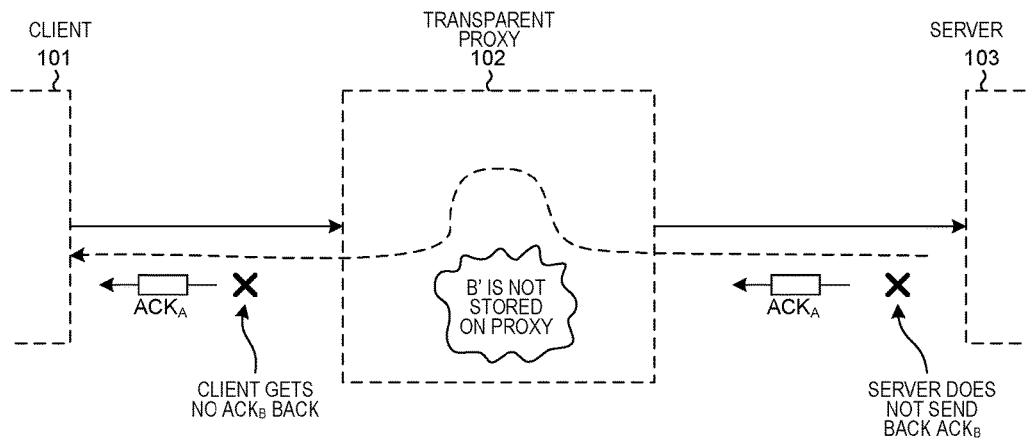
FIG. 15 is a diagram that shows how the proxy device does not return an ACK for one of the TCP segments output by the client device in the method of FIG. 12.
Figure 16:
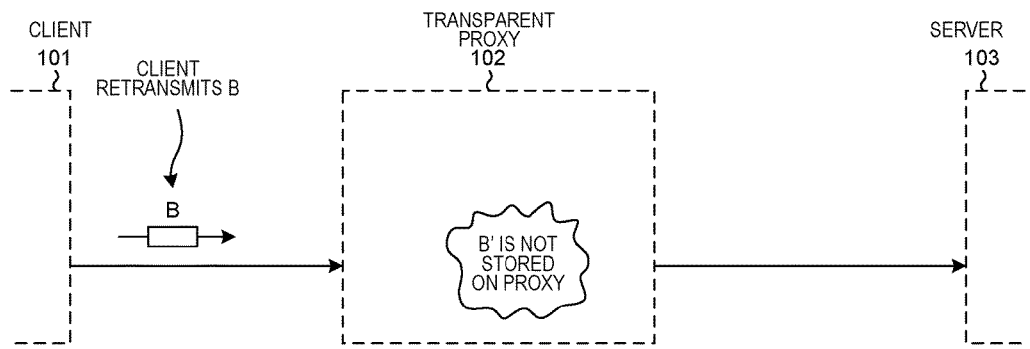
FIG. 16 is a diagram that shows how the client device retransmits a TCP segment for which no ACK was received in the method of FIG. 12.

Flowchart of FIG. 12 (FIGS. 12A and 12B) and Associated FIGS. 13-18:

FIGS. 12A and 12B form FIG. 12 which is a flowchart of a method 200 in accordance with one novel aspect. FIGS. 13-18 illustrate steps in the method in a simplified graphical form. Initially, as illustrated in FIG. 13, a first TCP segment A passes (carried in a link layer frame) from the client device to the proxy device. The frame is processed up the stack of the proxy device such that an SSL record is presented to the SSL layer of the stack. The SSL payload of the SSL record is decrypted using the K1 cryptographic parameter set. The SSL payload is then re-encrypted using the K2 cryptographic parameter set. The resulting SSL record is then passed back down the stack of the proxy device. The resulting TCP segment is denoted in the diagram of FIG. 13 as TCP segment A'. This segment A' is communicated from the proxy device to the server device. The notation A and A' used in FIG. 13 indicates that the actual TCP segments are different due to the use of the two different cryptographic parameter sets in the two SSL sessions. Next, a second TCP segment B is output from the client device and travels to the proxy device, and passes up and then down the stack of the proxy device, as the first TCP segment did. For some reason, however, the server device does not receive the second TCP segment B' (for example TCP segment B' is dropped by some device en-route to the server device). FIG. 14 is a diagram of the second TCP segment B. As illustrated in FIG. 15, the server device does not acknowledge receipt of TCP segment B' by returning an ACK to the proxy device. The proxy device therefore does not return an ACK to the client device acknowledging receipt of TCP segment B. As illustrated in FIG. 16, the client device responds after a timeout period by retransmitting TCP segment B. A copy of TCP segment B' is not stored on the proxy device.

In step (step 201), the retransmitted TCP segment B is received onto the proxy device 102. This is shown in FIG. 16. The TCP segment B is a TCP segment that carries an encrypted SSL payload.

From the TCP sequence number in the TCP header of the retransmitted TCP segment B, the proxy device determines (step 202) the TCP sequence number (in TCP sequence space) that corresponds to the start of the encrypted SSL payload. The row from the table 197 is identified whose TCP sequence number in the left column is the smallest and is still larger than the TCP sequence number from the TCP header. The TCP sequence number of this row is the TCP sequence number that corresponds to the start of the encrypted SSL payload.

From this TCP sequence number (that corresponds to the start of the encrypted SSL payload), the proxy device 102 determines (step 203) the start byte position (in SSL sequence space) of the SSL payload. The start byte position of the SSL payload is the middle value in the identified row of table 197 of FIG. 10.

From this start byte position (of the SSL payload in SSL sequence space) and from table 198 of FIG. 11, the proxy device identifies (step 204) the entry in table 198 whose SSL byte position is the smallest SSL byte position that is larger than the SSL byte position looked up using table 197 of FIG. 10. The identified entry in table 198 includes the SSL byte position, a decrypt engine state value, and an encrypt engine state value.

The decrypt engine is loaded (step 205) with the decrypt engine state value of the identified entry. The K1 cryptographic parameter set for the SSL session between client and proxy is therefore used.

Figure 17:
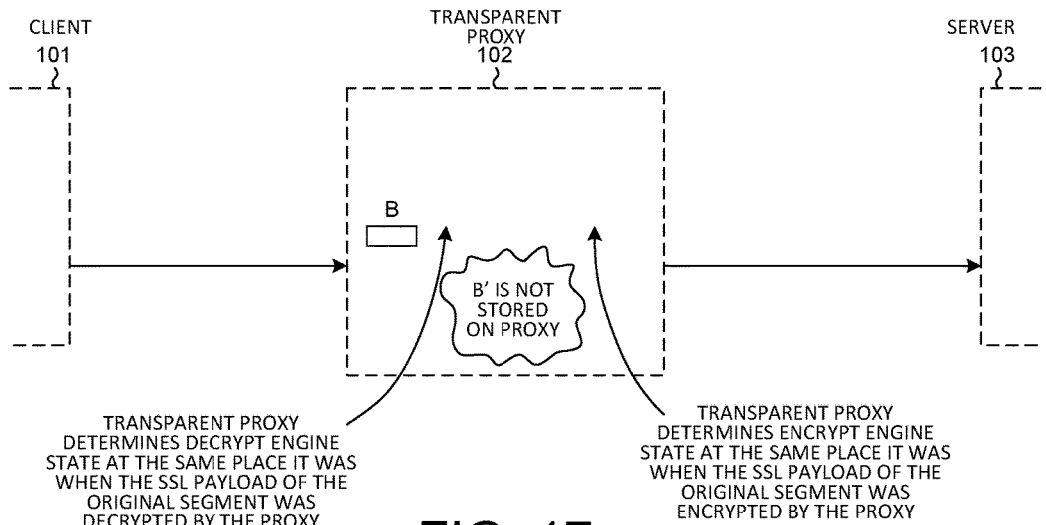
FIG. 17 is a diagram that illustrates the proxy device determining a decrypt engine state and an encrypt engine state in the method of FIG. 12.

The state of the decrypt engine is then incremented (step 206) a number of times equal to the difference between the start byte position of the identified entry of table 198 (in the leftmost column of table 198) and the start byte position identified from table 197 of FIG. 10 (from the middle column of table 197). This is illustrated in FIG. 17.

Figure 18:
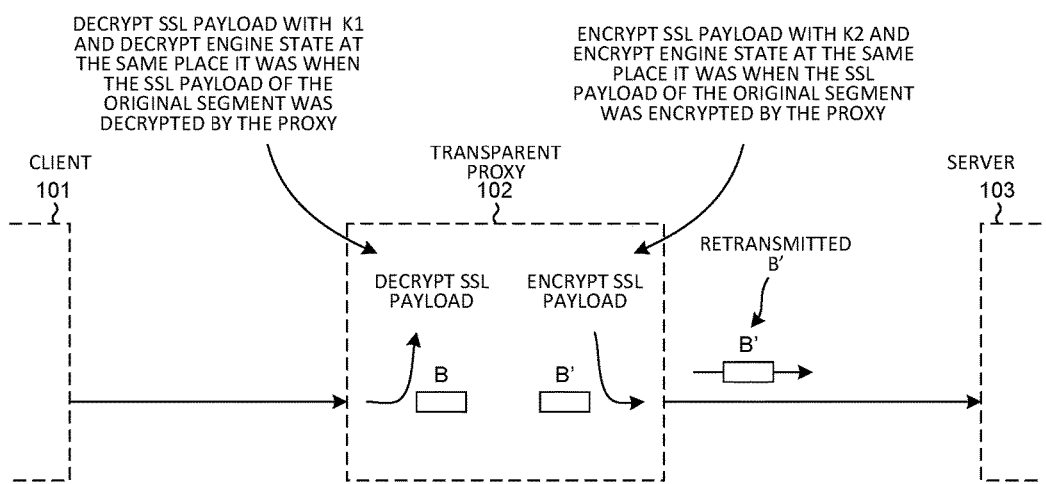
FIG. 18 is a diagram that illustrates how the proxy device generates a retransmit TCP segment to be retransmitted to the server device in the method of FIG. 12.

Once the decrypt engine has been advanced in this way, then the decrypt engine is used to decrypt (step 207) the encrypted SSL payload of the retransmit TCP segment B, byte by byte. The number of bytes to decrypt is indicated in the right column of the identified entry in table 197 of FIG. 10. The state of the decrypt engine is incremented at end of the decrypting of each byte. This is illustrated in FIG. 18.

Next, the result of this decryption is then immediately re-encrypted. To perform this re-encryption, the encrypt engine state from the identified entry in table 198 of FIG. 11 is loaded (step 208) into the encrypt engine. The K2 cryptographic parameter set for the SSL session between proxy and the server is therefore used.

The state of the encrypt engine is then incremented (step 209) a number of times equal to the difference between the start byte position (indicated in the leftmost column of the identified entry of table 198) and the start byte position (from the middle column of the identified entry in table 197). This increment number is the same as the number of times the decrypt engine was initially incremented (step 206) before decryption started. This is illustrated in FIG. 17.

Once the state of the encrypt engine has been advanced in this way, then the encrypt engine is used to encrypt (step 210) the previously decrypted SSL payload, byte by byte. The number of bytes that are then encrypted is indicated by the SSL payload length entry in the rightmost column of the identified entry in table 197 of FIG. 10. The state of the encrypt engine is incremented after the encrypting of each byte. The re-encryption is illustrated in FIG. 18.

The resulting SSL payload is formed into an SSL record, and the SSL record is passed down the stack such that TCP segment B' is generated (step 211). TCP segment B' is then transmitted (step 212) from the proxy device to the server device as part of a link layer frame. The format of the link layer frame is shown in FIG. 5. The retransmitted TCP segment B' has identical TCP payload to the previously transmitted TCP segment B' (as previously transmitted to the server device), but the proxy device did not store the TCP segment B' for retransmission, rather the TCP segment B' was regenerated by the proxy device from: 1) the incoming retransmit TCP segment, and 2) the stored SSL encrypt and decrypt state values. The retransmitted TCP segment B' is shown in FIG. 18.

Figure 19:
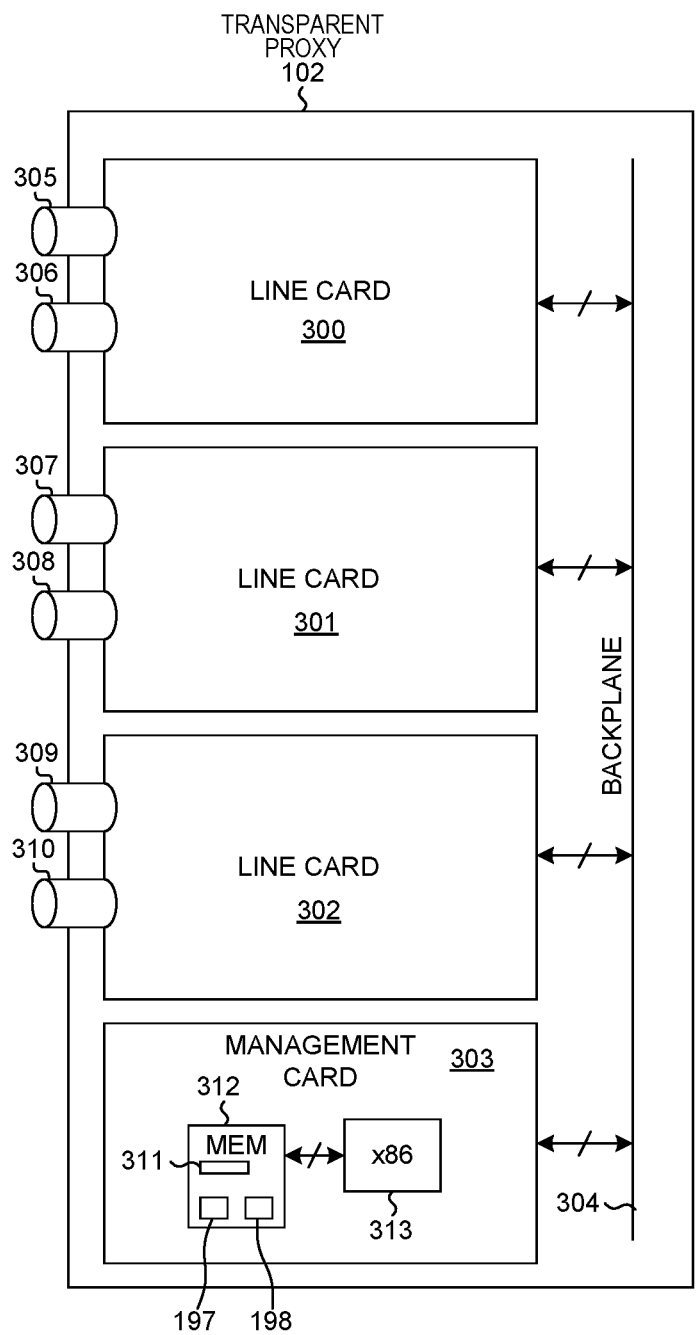
FIG. 19 is a diagram of one example of the network device (also referred to as a network appliance) that performs the method of FIG. 12.

Exemplary Proxy Device Hardware:

FIG. 19 is a simplified diagram of one example of the transparent proxy device 102 of FIG. 3. In this example, transparent proxy device 102 includes three line cards 300-302, a management card 303, and a backplane and backplane connector/bus 304. Reference numerals 305-310 identify physical ports, which in this case are optical fibers and their associated transceiver circuitry (not shown). Transparent proxy device 102 may receive packets from client device 101 via one of these ports, may transmit packets to client device 101 via another of these ports, may receive packets from edge router 105 via another of these ports, and may transmit packet to edge router 105 via another of these ports. Transparent proxy device 102 may communicate unencrypted information to IPS device 104 by yet another of these ports. Software (a set of processor-executable instructions) 311 stored in memory (a processor-readable medium) 312 and executing on a processor 313 (for example, a x86-architecture processor) of the management card 303 in this example manages and controls the line cards 300-302, and performs the encryption and decryption operations set forth in connection with the flowchart of FIG. 12. Although a specific architecture of an example of transparent proxy device 102 is illustrated, virtually any network device capable of TCP/IP communications can be made to carry out the method 200 of FIG. 12, including a general purpose server or a general purpose computer such as a PC. The generalized functionality of the method 200 of FIG. 12 can be built into the stack of an operating system, such as a Windows operating system, a Linux operating system, or a FreeBSD operating system. The resulting set of processor-executable instructions can be stored on a non-transitory processor-readable readable medium such as, for example, an optical disc, a magnetic disc, and a semiconductor memory.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) receiving a first Transmission Control Protocol (TCP) segment from a client in a first Secure Sockets Layer (SSL) session and transmitting the first TCP segment to a server in a second SSL session, wherein the first TCP segment is communicated from the client through a network appliance and to the server via a flow of a TCP connection;
   (b) receiving a retransmit TCP segment from the client onto the network appliance, wherein the retransmit TCP segment is a retransmit of the first TCP segment, wherein the first TCP segment as transmitted from the client in (a) had a TCP payload, and wherein at a time of the receiving of (b) the network appliance did not store the TCP payload;
   (c) storing a number of decrypt engine states on the network appliance, wherein the decrypt engine states are decrypt engine states for the flow of the TCP connection, wherein at a time a number of TCP segments communicated from the network appliance to the server via the flow are unacknowledged, and wherein the number of decrypt engine states stored in (c) is smaller than the number of unacknowledged TCP segments;
   (d) using one of the decrypt engine states to set the state of a decrypt engine;
   (e) using the decrypt engine to decrypt an SSL payload of the retransmit TCP segment thereby generating an unencrypted SSL payload, wherein the decrypt engine implements a stream cipher;
   (f) encrypting the unencrypted SSL payload thereby generating a re-encrypted SSL payload; and
   (g) transmitting a retransmit TCP segment from the network appliance to the server via the second SSL session, wherein the retransmit TCP segment transmitted in (g) includes the re-encrypted SSL payload.

2. The method of claim 1, wherein the number of decrypt engine states stored in (c) for the flow of the TCP connection varies over time as TCP segments are communicated across the flow of the TCP connection.

3. The method of claim 1, wherein the using of the decrypt engine state in (d) to set the state of the decrypt engine involves: 1) loading the decrypt engine state into the decrypt engine, and 2) after the loading then incrementing the decrypt engine.

4. The method of claim 1, wherein the network appliance stores a data structure having a plurality of entries, wherein each entry includes: 1) a TCP sequence number for the start of an SSL payload in TCP sequence space, and 2) a start byte position for the start of the SSL payload in SSL sequence space.

5. The method of claim 4, wherein the network appliance uses a TCP sequence number in a TCP header of the retransmit TCP segment received in (b) to identify an entry in the data structure.

6. The method of claim 4, wherein the TCP sequence number of an entry in the data structure is not a TCP sequence number in a TCP header.

7. The method of claim 4, wherein a particular TCP segment comprises a first SSL payload and a second SSL payload, wherein the data structure has a first entry for the first SSL payload, and wherein the data structure has a second entry for the second SSL payload.

8. A method comprising:
(a) receiving a first Transmission Control Protocol (TCP) segment from first network device in a first Secure Sockets Layer (SSL) session and transmitting the first TCP segment to a second network device in a second SSL session, wherein the first TCP segment is communicated from the first network device through a network appliance and to the second network device via a flow of a TCP connection, wherein the network appliance has a decrypt engine;
(b) receiving a retransmit TCP segment from the first network device onto the network appliance, wherein the retransmit TCP segment is a retransmit of the first TCP segment, wherein the retransmit TCP segment has an SSL payload;
(c) storing a number of decrypt states on the network appliance;
(d) loading one of the decrypt engine states into the decrypt engine;
(e) using a TCP sequence number of the retransmit TCP segment to increment the decrypt engine, thereby setting the state of the decrypt engine;
(f) using the decrypt engine to decrypt the SSL payload of the retransmit TCP segment thereby generating an unencrypted SSL payload;
(g) regenerating a retransmit TCP segment on the network appliance, wherein the retransmit TCP segment is regenerated using: 1) the retransmit TCP segment received in (b), and 2) an encrypt engine state value, wherein the TCP segment that is regenerated in (g) includes a TCP payload, and wherein the network appliance does not store the TCP payload at a time the regenerating of (g) starts; and
(h) transmitting the retransmit TCP segment regenerated in (g) from the network appliance to the second network device via the second SSL session.

9. The method of claim 8, wherein the decrypt engine implements a stream cipher.

10. The method of claim 8, wherein the network appliance stores a data structure, wherein the data structure includes a plurality of entries, and wherein each entry includes a decrypt engine state value and a SSL byte position.

11. The method of claim 10, wherein the SSL byte position is start byte position.

12. The method of claim 11, wherein the decrypting of the SSL payload in (f) involves decrypting the SSL payload byte by byte, and wherein the state of the decrypt engine is incremented after each byte is decrypted.

13. The method of claim 8, wherein the decrypt engine state of (d) is also used in the regenerating of the retransmit TCP segment in (g).

14. The method of claim 8, wherein the TCP sequence number is used by the network appliance to determine a start byte position, and wherein the network appliance uses this start byte position to identify an entry in a data structure, wherein the data structure includes a plurality of entries, wherein each entry in the data structure includes a decrypt engine state and a SSL byte position, and wherein the decrypt engine state that is loaded in (d) is the decrypt engine state of the identified entry.

15. A method comprising:
(a) receiving a first Transmission Control Protocol (TCP) segment onto a proxy device from a first network device in a first Secure Sockets Layer (SSL) session;
(b) transmitting a first TCP segment from the proxy device to a second network device in a second SSL session, wherein the first TCP segment transmitted in (b) has a TCP payload;
(c) after the transmitting of (b) not receiving an acknowledgment of the first TCP segment transmitted in (b) for a period of time such that a second TCP segment is received onto the proxy device from the first network device, wherein the second TCP segment is a retransmit TCP segment, wherein the second TCP segment has a TCP sequence number;
(d) generating a retransmit TCP segment on the proxy device, wherein the retransmit TCP segment generated in (d) has an identical TCP payload to the TCP payload of the first TCP segment transmitted from the proxy device in (b), wherein the proxy device did not store the retransmit TCP segment for retransmission but rather the retransmit TCP segment generated in (d) is regenerated by the proxy device from: 1) the second TCP segment received onto the proxy device in (c), and 2) SSL decrypt and encrypt state values stored on the proxy device; and
(e) transmitting the retransmit TCP segment generated in (d) from the proxy device to the second network device via the second SSL session.

16. The method of claim 15, wherein the proxy device has a decrypt engine, and wherein the proxy device uses the TCP sequence number to load a decrypt engine state into the decrypt engine and to increment the decrypt engine.

17. The method of claim 16, wherein the second TCP segment that is received by the proxy device in (c) includes an SSL payload, and wherein the proxy device uses the decrypt engine to decrypt the SSL payload.

18. The method of claim 15, wherein the proxy device stores a data structure having a plurality of entries, and wherein the proxy device uses the TCP sequence number to identify one of the entries in the data structure.

19. The method of claim 18, wherein the entry that is identified includes a decrypt engine state value, an encrypt engine state value and a SSL byte position.

20. The method of claim 15, wherein the receiving of (a), the transmitting of (b), the receiving of the second TCP segment onto the proxy device in (c), the generating of (d), and the transmitting of (e) are performed by the proxy device.

* * * * *